United States Patent [19]
Brooks et al.

[11] Patent Number: 6,109,873
[45] Date of Patent: Aug. 29, 2000

[54] SHIELD FOR MASKING A FLOW DIRECTING ASSEMBLY

[75] Inventors: Robert Theodore Brooks, Killingworth; Harvey Richard Toppen, Glastonbury, both of Conn.

[73] Assignee: United Technologies Corporation, Hartford, Conn.

[21] Appl. No.: 09/298,380

[22] Filed: Apr. 23, 1999

Related U.S. Application Data

[60] Provisional application No. 60/089,664, Jun. 17, 1998.

[51] Int. Cl.[7] .................... F01D 5/14; F01D 9/04; B05D 1/00
[52] U.S. Cl. .................. 416/62; 416/224; 416/229 A; 415/191; 415/200; 427/282; 427/287; 427/292; 427/448; 118/504; 118/505
[58] Field of Search .................. 416/62, 146 R, 416/224, 229 R, 229 A, 241 R, 241 A, 241 B; 415/191, 200; 244/121, 123, 129.1; 118/504, 505; 427/282, 287, 292, 448; 451/29, 445, 451–457

[56] References Cited

U.S. PATENT DOCUMENTS

| | | | |
|---|---|---|---|
| 4,082,870 | 4/1978 | Yenni | 427/425 |
| 4,305,697 | 12/1981 | Cohen et al. | 416/224 |
| 4,596,718 | 6/1986 | Gruner | 427/295 |
| 4,623,087 | 11/1986 | Conolly | 416/224 |
| 4,676,721 | 6/1987 | Hardee | 416/146 R |
| 5,702,574 | 12/1997 | Foster et al. | 118/500 |
| 5,792,267 | 8/1998 | Marszal et al. | 118/504 |
| 5,985,122 | 11/1999 | Conner | 427/282 |
| 6,037,004 | 3/2000 | Zajchowski et al. | 427/282 |

FOREIGN PATENT DOCUMENTS

| | | | |
|---|---|---|---|
| 789671 | 11/1935 | France | 416/229 R |
| 3821005 | 12/1989 | Germany | 416/224 |
| 54-10806 | 1/1979 | Japan | 416/224 |
| 56-112391 | 9/1981 | Japan | 416/241 A |
| 61-164002 | 7/1986 | Japan | 416/241 B |
| 412300 | 6/1934 | United Kingdom | 416/229 R |

Primary Examiner—Christopher Verdier
Attorney, Agent, or Firm—Gene D. Fleischhauer

[57] ABSTRACT

A shield 40 for use in processing a flow directing assembly 10, such as a stator vane or rotor blade, is disclosed. Various construction details are developed for the shield. The shield has two sides 52, 56 and at least two tabs 56, 58 which each extend from one of the sides and through the other side.

16 Claims, 4 Drawing Sheets

SHIELD FOR MASKING A FLOW DIRECTING ASSEMBLY

This application claims benefit from U.S. Provisional Application Ser. No. 60/089,664 filed on Jun. 17, 1998.

CROSS REFERENCE TO RELATED APPLICATIONS

This application contains subject matter related to the following copending U.S. patent application Ser. No. 08/994,676, filed Dec. 19, 1997, entitled SHIELD AND METHOD FOR PROTECTING AN AIRFOIL SURFACE and commonly assigned to the assignee of the subject application, and is related to copending U.S. patent applications Ser. No. 09/298,144 and Ser. No. 09/298,379, both filed Apr. 23, 1999.

TECHNICAL FIELD

This invention relates to a shield for protecting the surface of an airfoil and relates to protecting the airfoil from particles directed at such airfoils.

BACKGROUND OF THE INVENTION

An axial flow rotary machine, such as a gas turbine engine for an aircraft, has a compression section, a combustion section and a turbine section. An annular flow path for working medium gases extends axially through the sections of the engine. A rotor assembly extends axially through the engine. The rotor assembly includes a plurality of rotor blades which extend outwardly across the working medium flow path in the compression section and the turbine section. A stator assembly includes an outer case which extends circumferentially about the flow path to bound the working medium flow path. The stator assembly has arrays of stator vanes which extend radially inwardly across the working medium flow path between the arrays of rotor blades in both the compression section and turbine section.

The rotor blades and stator vanes are flow directing assemblies. Each has an airfoil which is designed to receive, interact with and discharge the working medium gases as the gases are flowed through the engine. Airfoils in the turbine section receive energy from the working medium gases and drive the rotor assembly at high speeds about an axis of rotation. Airfoils in the compression section transfer energy to the working medium gases to compress the gases as the airfoils are driven about the axis of rotation by the rotor assembly.

The airfoils in both sections extend radially across the working medium flow path. The airfoils in the compression section and turbine section are bathed in hot working medium gases under operative conditions. The gases may cause corrosion and unacceptably high temperatures at the surface of the airfoil, especially in the turbine section.

The airfoils in the turbine section are cooled by flowing cooling air through the airfoil. Each airfoil has cooling air holes. The cooling air holes extend from the interior to the exterior of the airfoil. The cooling air holes discharge cooling air and cool the airfoil by convection and by providing film cooling to regions of the airfoil such as the leading edge or the trailing edge.

The turbine airfoil also has protective coatings providing a thermal barrier to heat transfer and to provide oxidation resistance to the airfoil. These coatings are provided to selected regions of the airfoil, such as the platforms of stator vanes, the airfoils and the tips of the airfoil. The coatings may also vary depending on the location in the engine of the flow directing assembly which is coated.

In addition, airfoils in both the compressor section and turbine section extend into close proximity with the adjacent stator structure. The small clearance between these elements of the engine blocks the leakage of the working medium gases around the tips of the rotor blades. As a result, the tips of such airfoils may rub against such structure during transient operation. Alternatively, the tips are designed to cut a groove or channel in such structure. The blades extend into the channel under steady state operative conditions to decrease tip leakage.

The tips of such airfoils are often provided with an abrasive material and are axially aligned with adjacent radial structure which is provided with an abradable material. The combination of an abrasive tip with abradable material spaced radially from the tip enables the structure to accommodate movement of the blades outwardly and to accommodate interference between the tips of the blade and the adjacent structure. This occurs without destruction of the tip of the tip or the stator structure and enables the tip to cut the necessary groove if so required.

The abrasive material may be provided to a substrate at the airfoil tip by many techniques such as powder metallurgy techniques, plasma spray techniques, and electroplating techniques. One example of a plasma spraying device is shown in U.S. Pat. No. 3,145,287 to Siebein et al. entitled: "Plasma Flame Generator and Spray Gun". In Siebein, a plasma forming gas is disposed about an electric arc and passed through a nozzle. The gas is converted to a plasma state and leaves the arc and nozzle as a hot free plasma stream. Powders are injected into the hot free plasma stream and heated. The softened powder is propelled onto the surface of a substrate which receives the coating. Other examples of such devices are shown in U.S. Pat. No. 3,851,140 to Coucher entitled "Plasma Spray Gun and Method for Applying Coatings on a Substrate" and U.S. Pat. No. 3,914,573 to Muehlberger entitled "Coating Heat Softened Particles by Projection in a Plasma Stream of Mach 1 to Mach 3 Velocity".

The substrate is typically prepared for receiving the particles by cleaning and roughening the surface of the substrate. One technique uses a grit blasting apparatus to propel abrasive particles against the substrate by grit blasting. Portions of the airfoil are masked or shielded with a mask or shield to prevent the abrasive particles from damaging the airfoil and other portions of the blade.

It is preferable to use a shield, for example, for the airfoil surface adjacent the tip which may survive either the impact of abrasive particles or high temperatures of the coating process and block coatings from deposit at unwanted locations. Metal shields extending over several airfoils have been used with a screw fastener for the shield. A metal band having a tab is installed near the tip between the shield and the airfoil to fill the gap between the relatively rigid shield and the airfoil.

Another approach is to use a high temperature material, such as aluminum foil tape, which is suitable for use during the coating process to provide the masking or shielding. The aluminum tape is also suitable for use during the grit blasting operation. The aluminum tape has an adhesive backing which is used to affix the tape to the airfoil. The tape requires precise installation to maintain the correct clearance between the top of the rotor blade and aluminum tape which acts as a mask or shield. If an error occurs in installation, the tape is removed with difficulty because of the adhesive and new tape installed.

The aluminum tape remains in place for both the grit blasting and plasma coating operation. After removal from the grit blasting fixture, the rotor blade is reinstalled in the coating fixture. After receiving the plasma spray coating, the tape and its adhesive are removed, often with difficulty because the adhesive is an integral part of the tape and because it leaves a residue even after the tape is removed. The tape is expensive, labor intensive to apply, labor intensive to remove, and is not reusable.

Accordingly, the above are notwithstanding, scientists and engineers working under the direction of applicants assignee have sought to improve the shields used during the application of coatings to the tips of rotor blades.

SUMMARY OF INVENTION

This invention is in part predicated on the recognition that a shield for an airfoil may be formed with tabs and have a thickness of material that is thin enough to allow the material to conform to the suction surface and pressure surface of the airfoil and also have material in the tab region that is thick enough to accept a pulling force at installation and exert a holding force against a faying surface in the installed condition.

According to the present invention, a shield for masking an airfoil has two chordwise sides joined at a front edge with each side extending from the front edge to a rear edge and the sides of the shield are adapted to be joined at the rear edge by a pair of tabs extending from one side of the shield through an opening in the other side and bent over into a faying relationship with the other side.

In accordance with one detailed embodiment of the present invention, one side of the shield is longer than the other, with the long side of the shield being split into an upper portion extending chordwisely and a lower portion extending chordwisely to the rear edge, the upper portion and the lower portion overlapping one over the other in the spanwise direction for at least a part of the chordwise length.

In accordance with one embodiment of the present invention, the front edge is disposable adjacent the trailing edge of the airfoil and the second side is chordwisely longer than the first side such that the long side extends over the leading edge and overlaps the first side.

In accordance with one detailed embodiment of the present invention, the sides of the shield are spaced spanwisely from the base and spanwisely from the tip of the airfoil uncovering cooling holes at these locations; and, projections from the shield at the base of the airfoil and at the tip of the airfoil extend into cooling holes at these locations to shield the holes during the coating process.

A primary feature of the present invention is a shield for an airfoil having a front edge extending spanwise. Another feature is two sides which extend chordwise. Each side has a rear edge extending spanwise. One of the sides has tabs and the other has openings to receive the tabs which permits disposing the shield about the airfoil and pulling the tabs past the rear edge and through the other side. In the installed condition the tabs are pressed into faying relationships with the other side to urge the other side against the airfoil. Another feature is the length of the shield which positions the shield spanwisely from the base and tip of the airfoil.

A primary advantage of the present invention is the speed at which an array of rotor blades or stator vanes may be shielded for a coating process and for surface preparation such as by abrasive blasting. Another advantage is the decreased cost of surface preparation and the coating process which results from the durability of reusable shields as compared with those constructions which require destructive use of such shields. Still another advantage is the quality of the resulting coating which results from the removability of the shield without chipping or scratching of the applied coating.

The foregoing features and advantages of the present invention will become more apparent in light of the following detailed description of the best mode for carrying out the invention and accompanying drawings.

BEST MODE FOR CARRYING OUT THE INVENTION

Figure 1:
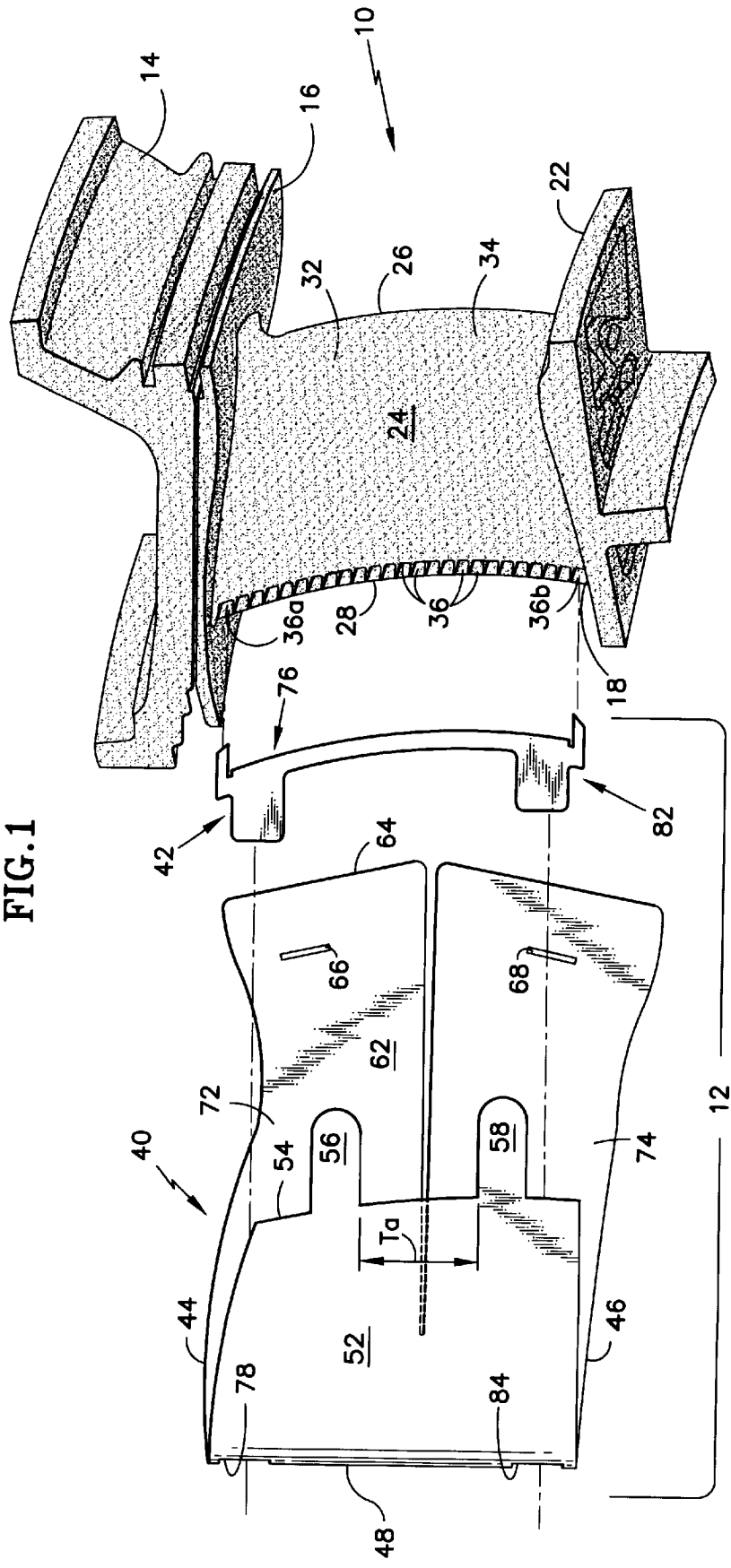
FIG. 1 is a perspective exploded view of a flow directing assembly, such as a stator vane, showing the relationship of the stator vane and shield assembly to each other and in particular showing a locking member and a metal shield having sides which are disposed over the airfoil of the stator vane.

FIG. 1 is a perspective view of a flow directing assembly, such as a stator vane 10, and an associated shield assembly 12. The stator vane has a base end 14 which includes a first platform 16. The stator vane has a tip end 18 having a second platform 22. A flow directing surface, as represented by an airfoil 24, extends from the first platform to the second platform.

Each airfoil has a leading edge 26 and a trailing edge 28. A suction surface 32 and a pressure surface 34 extend between the edges. The leading edge has a plurality of cooling air holes (not shown) and the trailing edge has a plurality of cooling air holes 36. The cooling air holes in the trailing edge are cut back revealing a slightly rectangular portion interrupted by pedestals which extend rearwardly between each cooling air hole. In alternate embodiments, the flow directing assembly might be a rotor blade having a base which has a root and a platform. The airfoil of a rotor blade typically terminates in a tip which, in some embodiments, might include a shroud which is analogous to a platform.

The shield assembly 12 includes a shield 40. In the embodiment shown, a locking member 42 is adapted to extend between the stator vane and the shield. The locking member might be separate from the shield or integrally attached to the shield. The shield is adapted to be disposed about the edge of the airfoil. The shield is formed of a suitable metal which can withstand the impact of the abrasive particles or coating particles and the temperature of any coating spray process. One suitable material is AMC 6513 (Aerospace Material Specification 6513) stainless steel having a thickness of about nine thousandths of an inch to fifty thousandths of inch (0.009–0.050 inches), with nine thousandths of an inch preferable for some applications.

The shield has a first end 44 which is adapted to be in close proximity to the first platform 16. The shield has a second end 46 which is adapted to be in close proximity to the second platform. A front edge 48 extends spanwise between the second end and the first end. A first side 52 extends from the front edge. The first side has a rear edge 54 spaced chordwise from the front edge. A first tab 56 extends from the rear edge at the first end. A second tab 58 extends from the rear edge and is spaced spanwise from the first tab leaving a gap Ta therebetween.

The metal shield has a second side 62 extending chordwise from the front edge. The second side has a rear edge 64 spaced spanwise from the front edge and adjacent to the rear edge of the first side. The second side is longer in the chordwise direction than the first side. The rear edge of the second side is spaced chordwisely from the rear edge of the first side in the installed condition.

The second side has first opening 66 and a second opening 68. Each opening is chordwisely spaced from the rear edge 64 of the second side and closely adjacent the rear edge 54 of the first side in the installed condition. The first opening is at a spanwise location aligned with the first tab 56 and a second opening is at a spanwise location aligned with the second tab 58. The first and second tabs are adapted to extend through the openings in the second side and extend over the first side and in faying contact with the first side of the shield in the installed condition. In the installed condition the tabs extend at a location past the rear edge of the first side and are adapted to exert a force on the first side and the second side to urge the first and second sides into engagement with the side of an airfoil in the installed condition.

Figure 2:
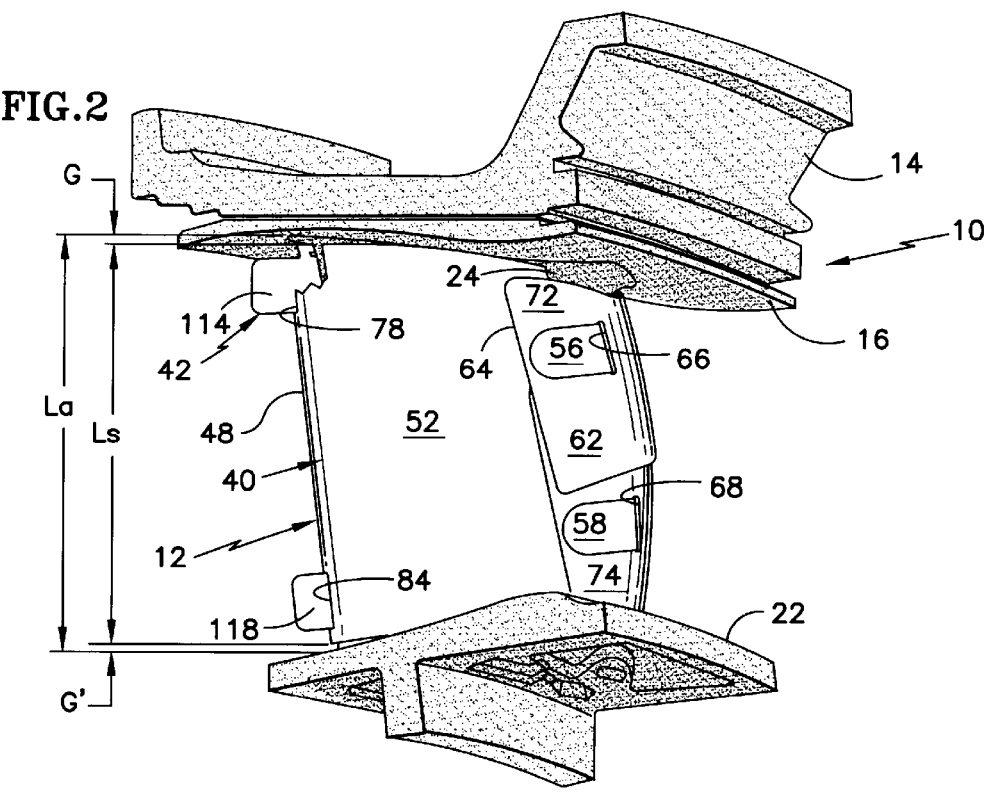
FIG. 2 is an assembled view of the flow directing assembly shown in FIG. 1, having a shield assembly disposed about the stator vane with a portion of the shield broken away to show the locking member.

As shown in FIG. 1, the long second side is split into an upper portion 72 extending chordwisely and a lower portion 74 extending chordwisely. As shown in FIG. 2, the portions are adapted to overlap one over the other in the spanwise direction in the installed condition over at least a portion of their chordwise length.

The locking member 42 has a first end region 76 adjacent the first platform 16. The first end region adapts the locking member to engage a first cooling air hole 36a at the trailing edge of the airfoil. The first end region also adapts the locking member to engage in the spanwise direction a first front opening 78 in the shield 44. The locking member has a second end region 82 adjacent the second platform which adapts the locking member to engage a second cooling air hole 36b at the trailing edge of the airfoil. The second end region also adapts the locking member to engage in the spanwise direction a second front opening 84 in the shield.

FIG. 2 shows the stator vane 10 shown in FIG. 1 and the shield assembly 12 in the installed condition. As shown in FIG. 2, the long second side 62 of the shield overlaps the first side 52. The upper portion 72 and lower portion 74 of the long second side overlap each other in the spanwise direction. The tabs 56,58 on the first side extend at a location past the rear edge of the second side through the openings 66,68 in the second side. The tabs are bent over into a faying relationship with the second side to urge the second side toward the pressure surface of the airfoil.

The shield is partially broken away in the end region to show the engagement between the locking member 42, the airfoil 24 and the shield 40. The tab 114 of the locking member extends through the first front opening 78 in the shield and restrains the shield against movement in the spanwise direction. The width of the opening is slightly greater than the thickness of the tab and provides for close conformance between the tab and the shield.

Figure 3:
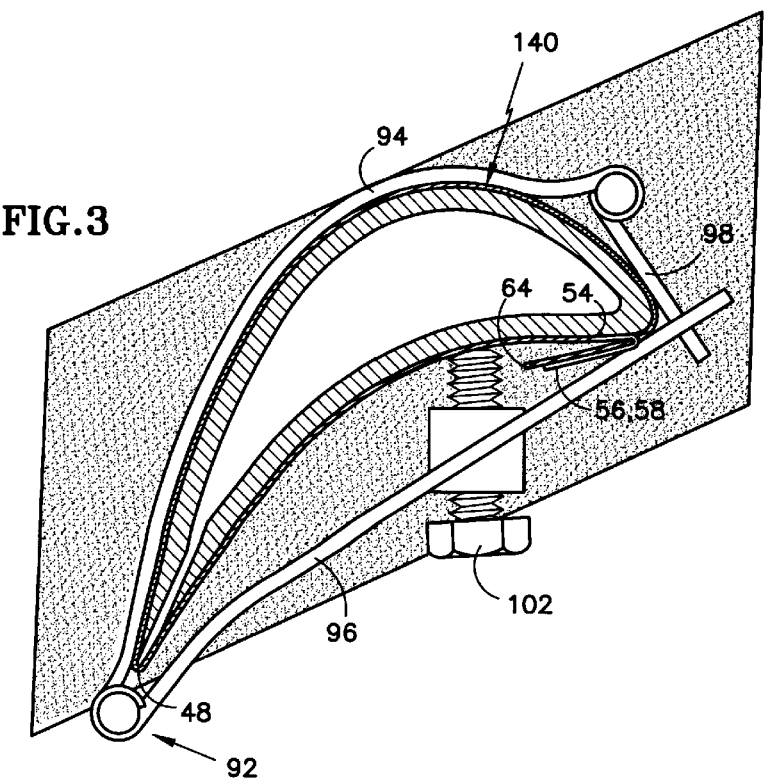
FIG. 3 is a side elevation view of the shield assembly shown in FIG. 2 and is a cross sectional view taken along the lines 3—3 of FIG. 1 showing the relationship of the stator vane and shield assembly to a clamping device for exerting a force on the metal shield and the pressure surface of the airfoil.

FIG. 3 is a cross-sectional view of an alternate embodiment of the shield assembly 12 shown in FIG. 2 having a shield 140. In FIG. 3, the locking member 42 is eliminated. A clamp 92 is disposed about the exterior of the shield. The clamp has a first side 94 and a second side 96. The first side and the second side of the clamp are attached to each other near the front edge 48 of the shield and the rear edge 54 of the first side and the rear edge 63 of the second side 62. The first side of the clamp rotatably engages the second side near the front edge 48 of the shield. At the rear edge of the shield, the first side of the clamp includes a hinged crosspiece 98 which rotatably engages part of the first side and which engages the second side 96. A threaded member, such as a bolt as represented by the bolt 102, threadably engages the second side of the clamp. The bolt presses against the first side of the shield to urge the shield against the airfoil and restrain the shield against spanwise movement. The clamp may also be used with the embodiment shown in FIG. 2 in which case the assembly would include a locking member at the front edge of the shield disposed adjacent the trailing edge of the airfoil as shown in FIG. 3A.

Figure 3A:
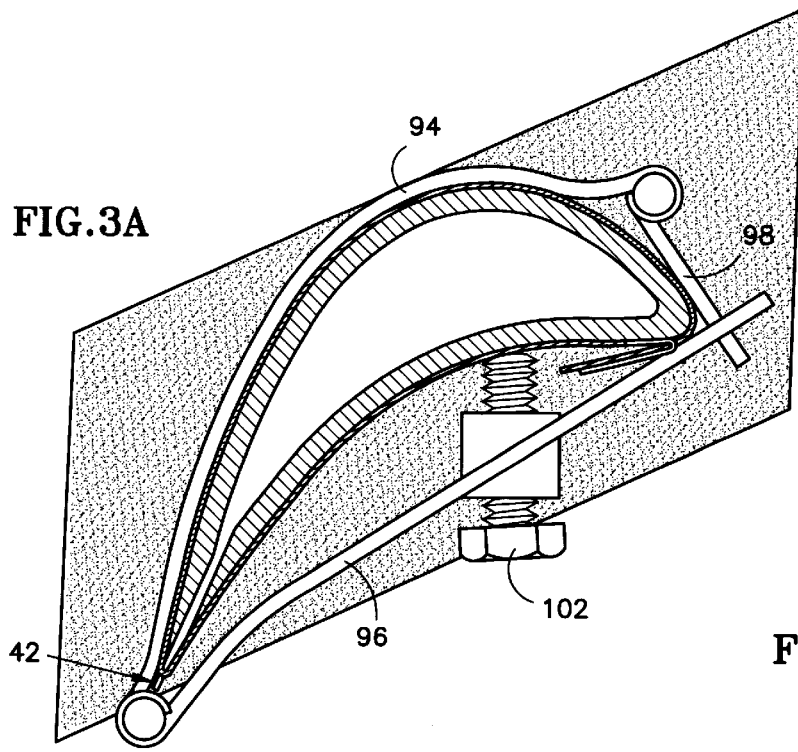
FIG. 3A is an alternate embodiment of the shield assembly shown in FIG. 2.
Figure 4:
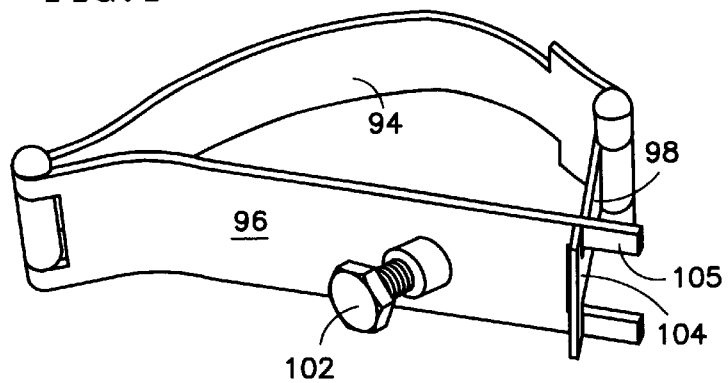
FIG. 4 is a perspective view of a clamp assembly.

FIG. 4 is a perspective view of the clamp assembly shown in FIG. 3 and FIG. 3A. The hinged crosspiece 98 has a T-shape element 104 that engage tangs 105 extending forwardly from the second side.

Figure 5:
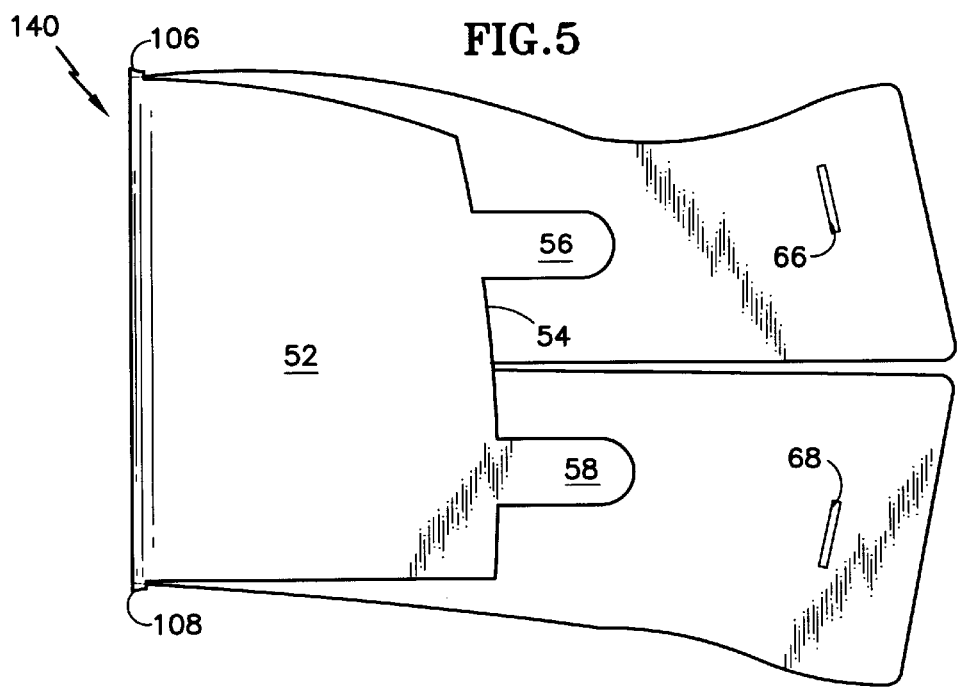
FIG. 5 is a side elevation view of the shield assembly shown in FIG. 3A.

FIG. 5 is a view of the shield 140 shown in FIG. 3A which is an alternate embodiment of the shield shown in FIG. 2. The shield 140 shown in FIG. 5 does not have openings in the front edge of the shield. The shield does not use a locking member of the type shown in FIG. 1 and FIG. 2. Instead, the shield has a first projection 106 at the first end 44 which extends spanwisely from the first end and a second projection 108 at the second end 46 which extends spanwisely from the second end. The projection extends chordwisely to cover the endmost cooling air holes 36a, 36b. Typically the projection will extend chordwisely less than onefourth the chordwise length of one of said sides.

Figure 5A:
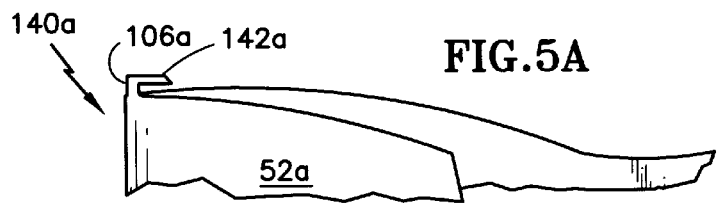
FIG. 5A is an alternate embodiment of the locking member shown in FIG. 5.

Alternatively, the shield 140a may have a locking member 106a integrally formed with the shield as shown in FIG. 5A. The locking member is integrally attached to the shield by acting as one piece with the shield, whether it is attached by a bonding technique, integrally formed at the time of manufacture as an appendage, or formed by some other method for forming a structure that acts as one piece. The locking member 106a has a projection 142a. The projection shields the end most cooling air holes which are protected when using the locking member by inserting part of the locking members into the holes.

Figure 6C:
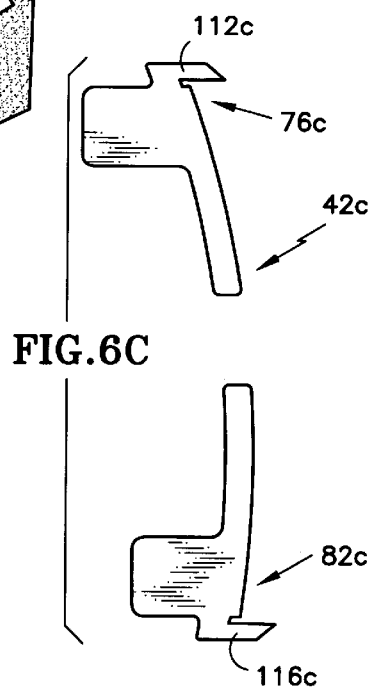
FIG. 6C is an enlarged view of the locking member shown in FIG. 6.
Figure 6:
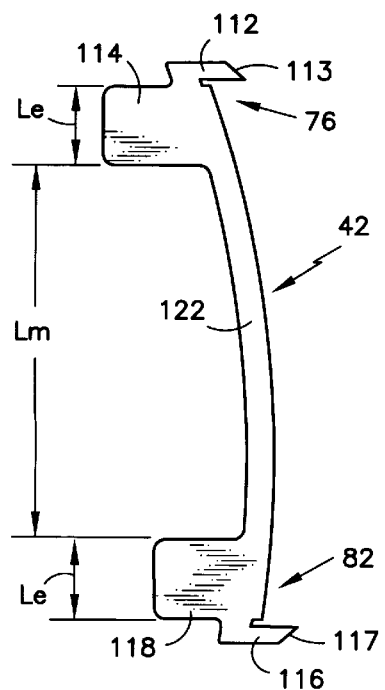
FIG. 6 is an enlarged view of the locking member shown in FIG. 1.

FIG. 6 is an enlarged view of the locking member 42. The first end region 76 has a first L-shaped projection 112 which adapts the locking member to engage the first cooling air hole 36a at the trailing edge of the airfoil. The L-shaped projection has tapered end 113. The L-shaped projection extends in a first direction which is directed generally chordwise and toward the interior of the airfoil. The first end region has a first tab 114 which adapts the locking member to engage the first opening 82 in the shield 40 at the trailing edge 28 of the airfoil. The first tab extends in a direction opposite to the first direction. Similarly, a second L-shaped projection 116 is at the second end region 82. The second L-shaped projection is spaced spanwisely from the first L-shaped projection and adapts the locking member to engage a second cooling air hole 36b at the trailing edge of the airfoil. The second L-shaped projection 116 extends in the same direction as the first L-shaped projection toward the interior of the airfoil. The second L-shaped projection has a tapered end 117. The second end region has a second tab 118 which adapts the locking member to engage the second opening 84 in the shield at the trailing edge of the airfoil. The second tab extends in a direction opposite to the first direction.

The locking member includes a spanwise mid region 122 which joins the first end region 114 to the second end region 118. The length of the mid region $L_m$ is greater than four times the length of the tab of the end region $L_e$ and four times greater than the width of the midregion $W_{mr}$, as measured in a direction generally parallel to the extension of the L-shaped projection. The mid-region is generally curved, following the contour of the trailing edge of the airfoil. The shaped projections block movement of the shield to maintain a gap G and G' between the shield and the first and second platforms which exists because the airfoil has a length $L_a$ between the first platform and the second platform at the tip which is greater than the length $L_s$ of the shield. As will be realized, the L-shaped projections also act as a shield for the endmost cooling air holes 36a, 36b from particles directed at the airfoil, such as during processing operations or coating operations, and shield surfaces bounding the hole from any coating that might adhere to the interior of the hole as the coating is applied to the airfoil.

Figure 6A:
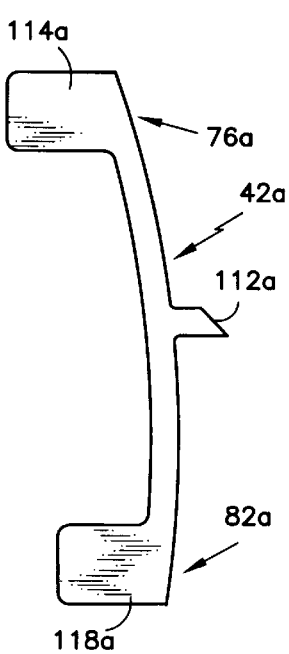
FIG. 6A is an alternate embodiment of the locking member shown in FIG. 6.
Figure 6B:
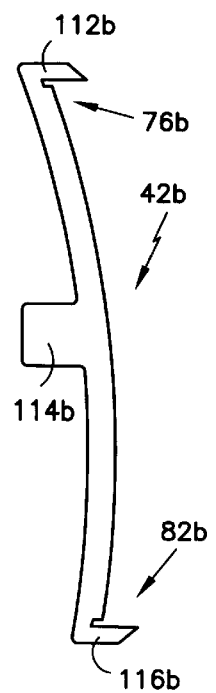
FIG. 6B is an enlarged view of the locking member shown in FIG. 6.

Other embodiments of the locking member include an embodiment, as shown in FIG. 6A in which the locking member has a pair of tabs 114a, 118a which engage a pair of openings in the shield. The locking member has a single projection 112a disposed between the tabs which engages a cooling hole in the airfoil. Alternatively, as shown in FIG. 6B, the locking member might have a pair of L-shaped projections 112b, 116b and a single tab 114b which engages the shield. The locking members might also be formed of a pair of locking members, as shown in FIG. 6C, each having L-shaped projections 112c, 116c spaced one from the other by a much shorter distance than the mid-region shown in FIG. 6 and each having a single tab extending to engage the corresponding opening in the shield. In such an embodiment, the pair of locking members might be chordwisely spaced one from the other and either joined by a length smaller than the length Lm shown in FIG. 6 or not joined by a mid-region.

Prior to applying one of the selected coatings to the airfoil, the locking member 42 is disposed in the cooling air holes 36a, 36b causing the locking member to act as a shield for the cooling air holes. The shield 40 is disposed about the airfoil. The tabs 56, 58 are inserted through the openings in the second side and pulled rearwardly with a gripping device, such as a pair of pliers, over the second side and pressed tightly against the side in a faying relationship. The shield presses tightly against the flow directing assembly. The shield wraps about the leading edge of the airfoil and about the locking member, trapping the locking member 42 in the chordwise direction. Tabs 114, 118 of the locking member extend through the openings 78, 84 in the front of the shield to block the shield against spanwise movement. The tabs 114, 118 may also be bent over or may just extend rearwardly as shown in FIG. 2. In addition, the clamping device may exert a force against the suction side of the airfoil pressing the shield tightly against the airfoil and the bolt-like member exerts a force against the shield pressing it tightly against the pressure surface of the airfoil. This further serves to lock the shield in place leaving predetermined gaps G and G' between the airfoils in the platform.

A particular advantage of the present invention is the ease of installing a shield to the rotor blade. The ease of assembly facilitates production speed and the shield is reusable.

Another advantage is the integrity of the coating which results from insuring that the coating does not adhere to portions of the airfoil where the coating for the platforms is not wanted. Another advantage is the integrity of a metallic coating provided prior to the coating operation for the platform. This results from using the locking member to restrain movement of the shield and avoiding caulking of the shield with respect to the airfoil which might result in gouging. In those coatings having a large variation in temperature, experience has shown on occasion the projection shown in the alternate embodiment in FIG. 5 may rub against the coating and cause degradation of the metallic coating. Another advantage is the inexpensivness of the shield which results from its inexpensive sheet metal-like construction and the reusability of the shield.

A particular advantage is securing the shield in place using the locking member. The locking member both shields the cooling air hole and locks the shield in place to the airfoil utilizing the cooling holes as a means for restraining the locking member and the shield against movement.

Although the invention has been shown and described with respect to detailed embodiment thereof, it should be understood by those skilled in the art that various changes in form and detail thereof may be made without departing from the spirit and the scope of the claimed invention.

We claim:

1. A shield for masking an airfoil of a flow directing assembly, the airfoil having a leading edge and a trailing edge extending spanwise, a suction surface and a pressure surface, each of which extends chordwise between the leading edge and the trailing edge of the airfoil, which comprises:

a front edge extending spanwise which is adapted to be disposed adjacent to an edge of the airfoil in an installed condition;

a first side extending chordwise from the front edge, the first side having a rear edge spaced chordwise from the front edge, a second side extending chordwise from the front edge which has a rear edge adjacent to the rear edge of the first side;

a first tab and a second tab extending from the rear edge of at least one of said sides, the second tab having at least a portion which is spaced spanwisely from the first tab;

wherein each tab extends from the rear edge through the other side at a location on the other side past the rear edge of the other side and is adapted to extend into faying relationship with the other side to urge the shield into engagement with the airfoil.

2. The shield of claim 1 wherein the shield consists essentially of metal.

3. The shield of claim 2 wherein the metal shield consists essentially of stainless steel.

4. The shield of claim 3 wherein the thickness of the metal shield is about nine-thousandths of an inch (0.009 inches).

5. The shield of claim 1 wherein the first tab and second tabs extend from the first side and the entire portions of tabs are spaced spanwisely one from the other and wherein the second side is longer than the first side and has a pair of openings spanwisely aligned with the tabs to receive the tabs.

6. The shield of claim 5 wherein the shield consists essentially of metal.

7. The shield claim 6 wherein the metal shield consists essentially of stainless steel.

8. The shield of claim 1 which further includes a shield projection which extends spanwisely from a first end of the shield and a second end of the shield and chordwisely less than one-fourth the chordwise length of one of said sides.

9. The shield of claim 5 wherein the second side is split into an upper portion extending chordwisely and a lower portion and wherein the upper and lower positions are adapted to overlap one over the other in the spanwise direction in the installed condition over at least a portion of their chordwise length.

10. The shield of claim 5 wherein the flow directing assembly has a first platform from which the airfoil extends and has a tip to which the airfoil extends, the tip having a second platform, the airfoil has a spanwise length La and the shield has a spanwise length Ls which is less than the spanwise length La of the airfoil such that a gap G' exists between the shield and the first platform and a gap G exists between the shield and second platform in the installed condition.

11. The shield of claim 9 wherein the flow directing assembly has a tip and a platform to which the airfoil extends, the airfoil has a spanwise length La and the shield has a spanwise length Ls which is less than the spanwise length La of the airfoil such that a gap G' exists between the shield and the platform and a gap G exists between the shield and tip in the installed condition.

12. A shield for masking an airfoil of a flow directing assembly, the assembly having a platform, the airfoil extending from the platform, the airfoil having a leading edge and trailing edge extending spanwise, a suction surface and a pressure surface, each of which extends chordwise between the leading edge and the trailing edge of the airfoil, the airfoil further having a tip and a length $L_a$ as measured from the platform to the tip, which comprises:

a metal shield having a length $L_s$ which is less than the length $L_a$, the shield having a first end which in an installed condition is spaced less than a predetermined distance G from the platform of the airfoil;

a second end which in the installed condition is spaced less than a predetermined distance G' from the tip of the airfoil;

a front edge extending spanwise from the first end to the second end;

first side extending chordwise from the front edge, the first side having a rear edge spaced chordwise from the front edge and a first tab extending from the rear edge at the first end, a second tab extending from the rear edge and spaced spanwise from the first tab leaving a gap $T_a$ therebetween;

a second side extending chordwise from the front edge, the second side extending for a chordwise distance which is greater than the chordwise distance of the first side in an uninstalled condition, the second side having a rear edge adjacent to the rear edge of the first side, but spaced chordwisely from the rear edge of the first side, a first opening and a second opening, each opening chordwisely spaced from the rear edge of the second side and closely adjacent the rear edge of the first side, the first opening being at a spanwise location aligned with the first tab and the second opening being at a spanwise location aligned with the second tab;

wherein the first and second tabs of the second side are adapted to extend through the openings in the first side and extend over the first side and in faying contact with the first side of the shield in the installed condition; and wherein the tabs exert a force on the first side and the second side to urge the first and second side into engagement with the sides of the airfoil in the installed condition.

13. The shield of claim 12 wherein the second side is split into an upper portion extending chordwisely and a lower portion which are adapted to overlap one over the other in the spanwise direction in the installed condition over at least a portion of their chordwise length.

14. The shield of claim 12 wherein the front edge has a first opening and a second opening which adapt the shield to engage a locking member in the installed condition.

15. The shield of claim 13 which further includes a shield projection which extends spanwisely from the first end and the second end and chordwisely less than one-fourth the chordwise length of one of said sides.

16. The shield of claim 12 wherein the airfoil is of the type having a first platform and also having a second platform extending from the tip, the second end being spaced less then the predetermined distance G' from the second platform.

* * * * *